L. B. BARTH.
FERTILIZER DISTRIBUTER.
APPLICATION FILED MAR. 16, 1911.

1,012,795.

Patented Dec. 26, 1911.
2 SHEETS—SHEET 1.

Witnesses
J. Milton Jester
A. Murray

Inventor
Luther B. Barth
By Shepherd & Campbell
Attorneys

L. B. BARTH.
FERTILIZER DISTRIBUTER.
APPLICATION FILED MAR. 16, 1911.

1,012,795.

Patented Dec. 26, 1911.
2 SHEETS—SHEET 2.

Witnesses

Inventor
Luther B. Barth
By Shepherd & Campbell
Attorneys

UNITED STATES PATENT OFFICE.

LUTHER B. BARTH, OF TIFFIN, OHIO.

FERTILIZER-DISTRIBUTER.

1,012,795.

Specification of Letters Patent.

Patented Dec. 26, 1911.

Application filed March 16, 1911. Serial No. 614,880.

*To all whom it may concern:*

Be it known that I, LUTHER B. BARTH, a citizen of the United States of America, residing at Tiffin, in the county of Seneca and State of Ohio, have invented certain new and useful Improvements in Fertilizer-Distributers, of which the following is a specification.

This invention relates to fertilizer distributers of the general character of that shown in my copending application, Serial No. 529,705, filed November 24th, 1909.

The object of the invention is to provide a device of this nature comprising a beater member disposed within a hood located at the rear of a wheeled body portion, the material delivered from said beater into said hood being delivered to a pair of oppositely rotating horizontally disposed distributer members from which distributer members, the material is thrown in a wide swath.

The present invention resides particularly in having the back wall of the hood hingedly and swingingly mounted. This back wall carries deflectors which deflect the material inwardly toward the center of the wall, the swinging movement of said wall in turn determining the point at which the material will fall upon the distributers as hereinafter set forth.

Further objects and advantages of the invention will be set forth in the detailed description which now follows.

Figure 1:
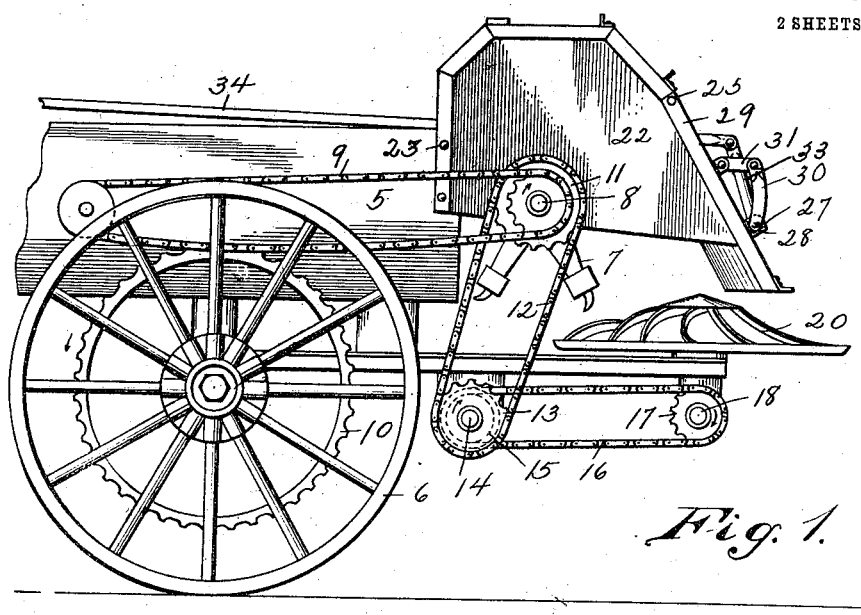
Figure 2:
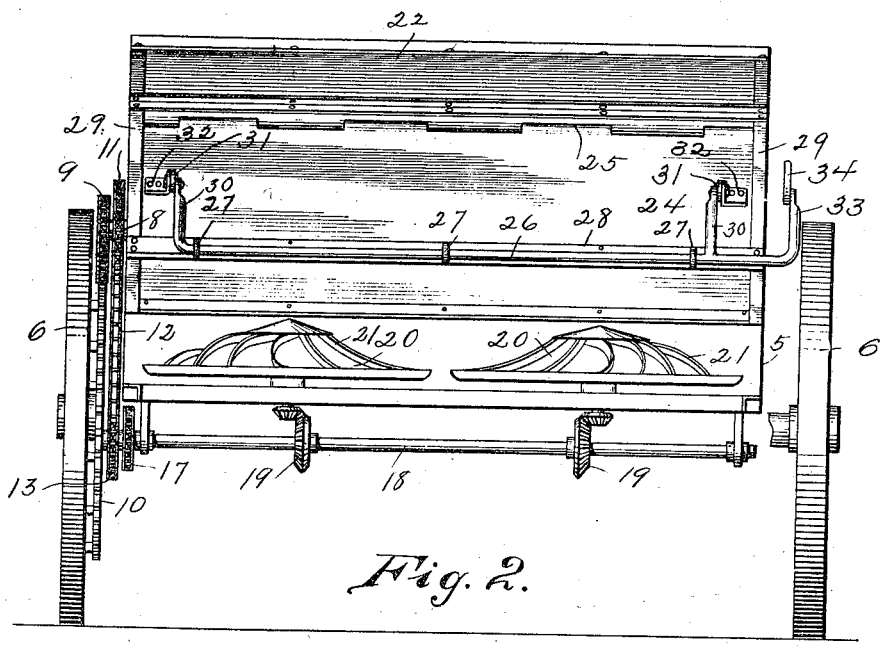
Figure 3:
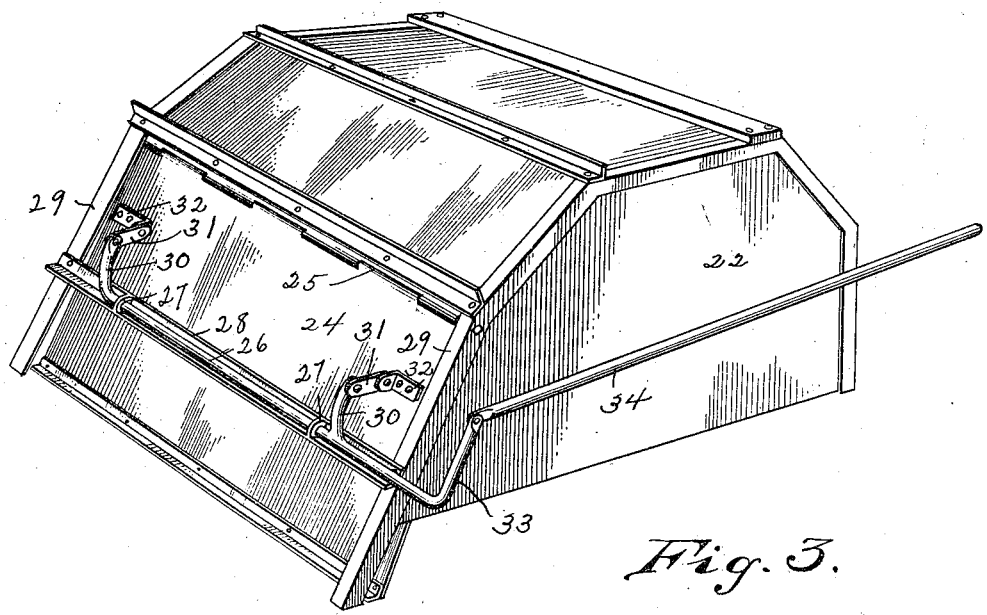
Figure 4:
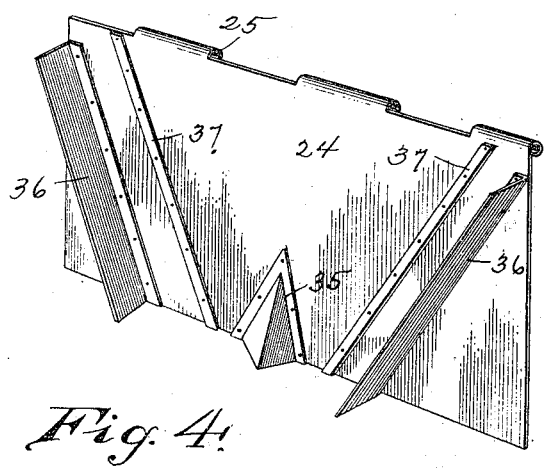

In the accompanying drawing, Figure 1 is a side elevation of the rear end of a fertilizer distributer constructed in accordance with the invention, Fig. 2 is a rear elevation thereof, Fig. 3 is a detail perspective view of the hood illustrating the means for actuating the rear wall of said hood, and Fig. 4 is a detail perspective view of the inner face of said rear wall, illustrating the deflectors.

Like numerals designate corresponding parts in all of the figures of the drawing.

Referring to the drawing, the numeral 5 designates the body portion mounted upon ground wheels 6.

A beater 7 is mounted upon a beater shaft 8 and is adapted to be actuated by a sprocket chain 9 and toothed annulus 10 in the usual manner. A sprocket wheel 11, sprocket chain 12 and sprocket wheel 13 impart movement from the beater shaft 8 to a shaft 14 and this movement is transmitted by a sprocket wheel 15, sprocket chain 16 and sprocket wheel 17 to a shaft 18 from which the distributers are driven. By means of bevel gearing 19, rotation is imparted to horizontally disposed distributers 20 preferably having radially disposed curved ribs 21 upon their upper faces. The beater 7 throws the material from the body 5 rearwardly into the hood 22 which is secured at 23 to the body 5 and which partially covers the beater 7. The rear wall 24 of this hood is hingedly connected at 25 to the remainder of said hood and is adapted to have a swinging movement imparted thereto when a shaft 26 is rocked. This shaft is mounted in bearings 27 of an angle iron 28, this angle iron being secured to the rear side frame members 29 of the hood. The shaft 26 carries crank arms 30 that are connected by links 31 to brackets 32, these brackets in turn being secured to the swinging rear wall 24. A crank arm 33 is connected to a rod 34, said rod extending forward adjacent the driver's seat (not shown) to permit the driver to move the rear wall as will be readily understood.

The deflectors hereinbefore referred to are shown in Fig. 4. There is a central nose-shaped deflector secured to the inner side of the hinged rear wall at the bottom edge thereof. Oppositely inclined deflectors, 36 are provided which direct the material inwardly toward said nose-shaped deflector. Additional deflector bars 37 aid in guiding the material.

While I have shown the shaft 26 mounted upon an angle iron, it is apparent that this shaft may be mounted in other ways and in fact that other mechanism for actuating the rear wall may be employed for many different structures could be devised for this purpose. What I desire to protect broadly is the idea of providing a swinging rear wall for a hood of this character to provide means for determining the point at which the material is to be delivered upon the distributers.

By providing the additional deflectors 37, the material is more evenly distributed over the distributers than would be the case if only the deflectors 36 were provided. The exact position and dimensions of the deflectors may be varied at will.

The object of providing the swinging rear wall is to facilitate the successful handling of fertilizing material of various kinds. Dry material flows off the distributer members much more readily than does wet material. Therefore, that either kind of material may be caused to fall upon the ground in the same relative position in the swath, it is necessary that the material be deposited upon the distributer members either well back or well forward, depending upon and corresponding to the condition of the material, it being evident that the wet material in this case must fall well forward as it does not fall off so readily and must acquire more momentum before it will leave the distributers under its centrifugal action.

By virtue of this structure with the distributers rotating at a given speed, a swath of uniform width can be spread regardless of the kind or condition of the fertilizing material handled. Likewise, a swath of uniform thickness can be deposited.

From the foregoing description, it will be seen that simple and efficient means are herein provided for accomplishing the objects of the invention, but while the elements shown and described are well adapted to serve the purposes for which they are intended, it is to be understood that the invention is not limited to the precise construction set forth, but includes within its purview such changes as may be made within the scope of the appended claims.

Having described my invention, what I claim is:

1. In a device of the character described, the combination with a body member, of a hood, means for discharging material from said body member into said hood, a swinging rear wall for said hood, and substantially horizontal, rotative distributers disposed beneath said hood and upon which said material falls.

2. In a device of the character described, the combination with a body member, of a hood, means for discharging material from said body member into said hood, a swinging rear wall for said hood, deflectors carried by said rear wall, and substantially horizontal, rotative distributers disposed beneath said hood and upon which said material falls.

3. In a device of the character described, the combination with a wheeled body portion, of a hood mounted upon the rear end thereof, a beater which discharges material from the body portion into said hood, means for driving said beater from the ground wheels, a pair of oppositely rotating horizontally disposed distributer members, and a swinging rear wall carried by said hood, the movement of which determines the point at which the fertilizing material falls upon said hood.

4. In a device of the character described, the combination with a wheeled body portion, of a hood mounted upon the rear end thereof, a beater which discharges material from the body portion into said hood, means for driving said beater from the ground wheels, a pair of oppositely rotating horizontally disposed distributer members, a swinging rear wall carried by said hood, the movement of which determines the point at which the fertilizing material falls upon said hood, and deflectors carried by said rear wall.

5. In a device of the character described, the combination with a wheeled body portion, of a hood mounted upon the rear end thereof, a beater which discharges material from the body portion into said hood, means for driving said beater from the ground wheels, a pair of oppositely rotating horizontally disposed distributer members, a swinging rear wall carried by said hood, the movement of which determines the point at which the fertilizing material falls upon said hood, and deflectors carried by said rear wall, said deflectors directing the material inwardly.

6. In a device of the character described, the combination with a body portion, ground wheels upon which said body portion is mounted, a hood fixed to the rear end of the body portion, a beater for discharging the material from said body portion into said hood, means for driving said beater from the ground wheels, a pair of horizontally disposed oppositely rotated distributer members located beneath said hood, a rear wall hinged along its upper edge to said hood, deflectors carried by said rear wall, a rock shaft, and connections between said rock shaft and said rear wall for varying the position of said rear wall.

In testimony whereof I affix my signature in presence of two witnesses.

LUTHER B. BARTH.

Witnesses:
CALVIN D. SPITLER,
CARL ABBOTT.